(12) United States Patent
LePort et al.

(10) Patent No.: US 10,714,735 B2
(45) Date of Patent: Jul. 14, 2020

(54) RESPONSE TO HIGH VOLTAGE ELECTROLYSIS OF COOLANT IN A BATTERY PACK

(71) Applicant: Tesla, Inc., Palo Alto, CA (US)

(72) Inventors: Francisco LePort, San Francisco, CA (US); Weston Arthur Hermann, Palo Alto, CA (US); Michael Bell, Pacific Palisades, CA (US)

(73) Assignee: Tesla, Inc., Palo Alto, CA (US)

( * ) Notice: Subject to any disclaimer, the term of this patent is extended or adjusted under 35 U.S.C. 154(b) by 247 days.

(21) Appl. No.: 15/970,415

(22) Filed: May 3, 2018

(65) Prior Publication Data

US 2018/0254470 A1    Sep. 6, 2018

Related U.S. Application Data

(63) Continuation of application No. 13/239,272, filed on Sep. 21, 2011, now Pat. No. 9,966,590.

(51) Int. Cl.
| | | |
|---|---|---|
| *H01M 2/34* | (2006.01) | |
| *H01M 10/60* | (2014.01) | |
| *H01M 10/625* | (2014.01) | |
| *H01M 10/63* | (2014.01) | |
| *H01M 10/6567* | (2014.01) | |
| *H01M 10/613* | (2014.01) | |

(52) U.S. Cl.
CPC ............. *H01M 2/34* (2013.01); *H01M 10/60* (2015.04); *H01M 10/613* (2015.04); *H01M 10/625* (2015.04); *H01M 10/63* (2015.04); *H01M 10/6567* (2015.04); *H01M 2220/20* (2013.01)

(58) Field of Classification Search
CPC .............................. H01M 10/60; H01M 10/63
See application file for complete search history.

(56) References Cited

U.S. PATENT DOCUMENTS

| | | |
|---|---|---|
| 4,945,010 A | 7/1990 | Kaufman et al. |
| 5,824,883 A | 10/1998 | Park et al. |
| 6,204,769 B1 | 3/2001 | Arai et al. |
| 2004/0137313 A1 | 7/2004 | Jaura et al. |
| 2006/0036883 A1 | 2/2006 | Hashizumi et al. |
| 2008/0318121 A1 | 12/2008 | Takagi |
| 2010/0047673 A1 | 2/2010 | Hirakawa et al. |
| 2010/0136391 A1 | 6/2010 | Prilutsky et al. |
| 2010/0136402 A1 | 6/2010 | Hermann et al. |
| 2010/0176334 A1 | 7/2010 | Evans et al. |
| 2011/0020676 A1 | 1/2011 | Kurosawa |
| 2012/0003513 A1 | 1/2012 | Fuhr |
| 2013/0017421 A1 | 1/2013 | Onnerud et al. |

FOREIGN PATENT DOCUMENTS

| | | |
|---|---|---|
| EP | 2107625 | 11/2012 |
| JP | 04109828 | 4/1990 |

OTHER PUBLICATIONS

PESWiki, PowerPedia:Electrolysis, Apr. 29, 2007, available at https://web.archive.org/web/20070429145543/http://www.peswiki.com/index.php/PowerPedia:Electrolysis.

*Primary Examiner* — Ladan Mohaddes
(74) *Attorney, Agent, or Firm* — Knobbe, Martens, Olson & Bear, LLP

(57) ABSTRACT

A battery pack includes an enclosure containing a plurality of battery modules. A cooling system disposed among and electrically isolated from the plurality of battery modules uses a coolant solution that is a first mixture of a first liquid and a second liquid in a predetermined ratio to produce a first boiling point. Boiling of the coolant solution changes the predetermined ratio to produce a second boiling point that is higher than the first boiling point and that is sufficient to induce a thermal runaway condition for the plurality of battery module. A sensor monitors at least one operational characteristic of the plurality of battery modules and a controller determines a possible high voltage electrolysis within the enclosure based upon the at least one operational characteristic. A remediation system is responsive to the possible high voltage electrolysis to decrease risks associated with the possible high voltage electrolysis when operated.

22 Claims, 2 Drawing Sheets

RESPONSE TO HIGH VOLTAGE ELECTROLYSIS OF COOLANT IN A BATTERY PACK

CROSS REFERENCE TO RELATED APPLICATIONS

The present U.S. Utility Patent Application claims priority pursuant to 35 U.S.C. § 120 as a continuation of U.S. Utility Application Ser. No. 13/239,272 entitled "RESPONSE TO HIGH VOLTAGE ELECTROLYSIS OF COOLANT IN A BATTERY PACK," filed Sep. 21, 2011, now issued as U.S. Pat. No. 9,966,590, which is hereby incorporated herein by reference in its entirety and made part of the present U.S. Utility Patent Application for all purposes.

INCORPORATION BY REFERENCE

This application is related to U.S. Utility patent application Ser. No. 12/942,465 entitled "FILL PORT FOR ELECTRIC VEHICLE BATTERY ENCLOSURE," filed Nov. 9, 2010; U.S. Utility patent application Ser. No. 12/942,501 entitled "PERFORATION APPARATUS AND METHOD FOR ELECTRIC VEHICLE BATTERY ENCLOSURE," filed Nov. 9, 2010; U.S. Utility patent application Ser. No. 13/239,235 entitled "DETECTION OF LOW VOLTAGE ELECTROLYSIS IN A BATTERY PACK," filed Sep. 21, 2011; U.S. Utility patent application Ser. No. 13/239,247 entitled "DETECTION OF HIGH VOLTAGE ELECTROLYSIS OF COOLANT IN A BATTERY PACK," filed Sep. 21, 2011; U.S. Utility patent application Ser. No. 13/239,262 entitled "RESPONSE TO LOW VOLTAGE ELECTROLYSIS IN A BATTERY PACK," filed Sep. 21, 2011, all the disclosures of which are hereby expressly incorporated by reference thereto in their entireties for all purposes.

BACKGROUND OF THE INVENTION

The present invention relates generally to detection and remediation of potentially hazardous conditions in an electric vehicle battery enclosure, and more particularly but not exclusively, to detecting and correcting high voltage electrolysis within the battery enclosure to limit possible excessive thermal conditions of the individual battery cells and modules.

Battery packs used with electric vehicles store large amounts of energy in a small space, producing high energy densities. These battery packs include an external housing that is designed for more than just environmental protection and packaging efficiency. The housing also enhances safety and stability, particularly under a range of anticipated abnormal operating conditions.

The battery packs are designed to provide high levels of safety and stability, yet situations can arise where a portion of a battery pack experiences a local thermal condition which generates significant heat. When the temperature is great enough and sustained, the local thermal condition can transform into a runaway thermal condition affecting wide areas of the battery pack, and sometimes the entire battery pack under certain circumstances. This runaway thermal condition can begin when the local thermal condition approaches the runaway thermal point, which can be about 200° C.

Battery pack designs include an integrated and isolated cooling system that routes coolant throughout the enclosure. When in good working order, the coolant from the cooling system does not come into contact with the electric potentials protected within. It does happen that sometimes a leak occurs and coolant enters into unintended parts of the enclosure. In certain situations, the coolant may be electrically conductive and can bridge terminals having relatively large potential differences. That bridging may start an electrolysis process in which the coolant is electrolyzed and the coolant will begin to boil when enough energy is conducted into the electrolysis. This boiling can create the local thermal condition that can lead to the runaway thermal condition described above.

The specific boiling point is dependent upon the characteristics of the coolant. For example, one type of coolant includes a mixture of ethylene-glycol and water which can boil at around 107° C. If enough coolant is in the enclosure and/or enough energy is used in electrolyzing the coolant, the boiling point rises due to chemical changes in the coolant from the localized boiling. In other words, the boiling of the coolant changes the boiling point. (For example, as the percentage of water is reduced in a glycol/water coolant mixture from the boiling, the boiling point increases. Pure ethylene-glycol has a boiling point of about 197° C.) As energy continues to be diverted into the electrolysis, the temperature of the local thermal condition rises and will reach close to the thermal runaway temperature if the electrolysis continues long enough under particular circumstances. Surfaces of the battery pack in contact with liquids at this temperature may initiate the runaway thermal condition.

The increasingly elevated temperature from the boiling coolant can therefore be great enough, depending upon many factors including the temperature and amount of coolant and location of the electrolysis, to initiate the runaway thermal condition. The chain reaction results from a heating of adjacent cells, which can cause them to overheat and fail, releasing heat that, in turn, propagates throughout the expanding affected area.

Once the reaction starts, it can continue to spread throughout the battery pack or a portion thereof until overheating cells are sufficiently cooled or the entire battery pack or the portion is consumed. A typical battery pack has a high thermal mass, mostly due to the mass of the cells. A failure of an individual cell provides for a relatively low energy release. Also, surrounding battery cells must be heated to as much as 200° C. or higher before they in turn release energy. These three factors mean that a full reaction that consumes all the cells of a battery pack may take anywhere from tens of minutes to many hours.

While the risk of the runaway thermal condition can be significant in cases of high-voltage electrolysis, another risk can develop as well. This risk is a consequence of the chemical reaction of electrolysis in which hydrogen gas is generated. Under some conditions, the hydrogen gas released during electrolysis can build-up inside the battery pack and become a possible hazard.

A conventional solution for a problem of an initiated chain reaction is to simply permit the reaction to run its course once passengers and bystanders are clear of the vehicle. This is because it can be difficult to safely stop the thermal reaction.

What is needed is an apparatus and method for detecting and responding to high voltage electrolysis within an electric vehicle battery enclosure to limit possible excessive thermal condition of the individual battery cells and modules.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide an apparatus and method providing for detecting and responding to high voltage electrolysis within an electric vehicle battery enclosure to limit possible excessive thermal condition of the individual battery cells and modules. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In the discussion herein regarding the preferred embodiments, a particular coolant mixture is contemplated to be used—namely a ethylene glycol/water mixture. More generically, the preferred embodiments are configured to detect and respond to a coolant distribution system that uses a coolant solution having a mixture of a first liquid and a second liquid in a predetermined ratio to produce a first boiling point for said coolant solution, wherein boiling of said coolant solution changes said predetermined ratio to produce a second boiling point for said coolant solution higher than said first boiling point and wherein said second boiling point is about equal to a temperature sufficient to induce a thermal runaway condition for one or more battery modules of said plurality of battery modules.

Figure 1:
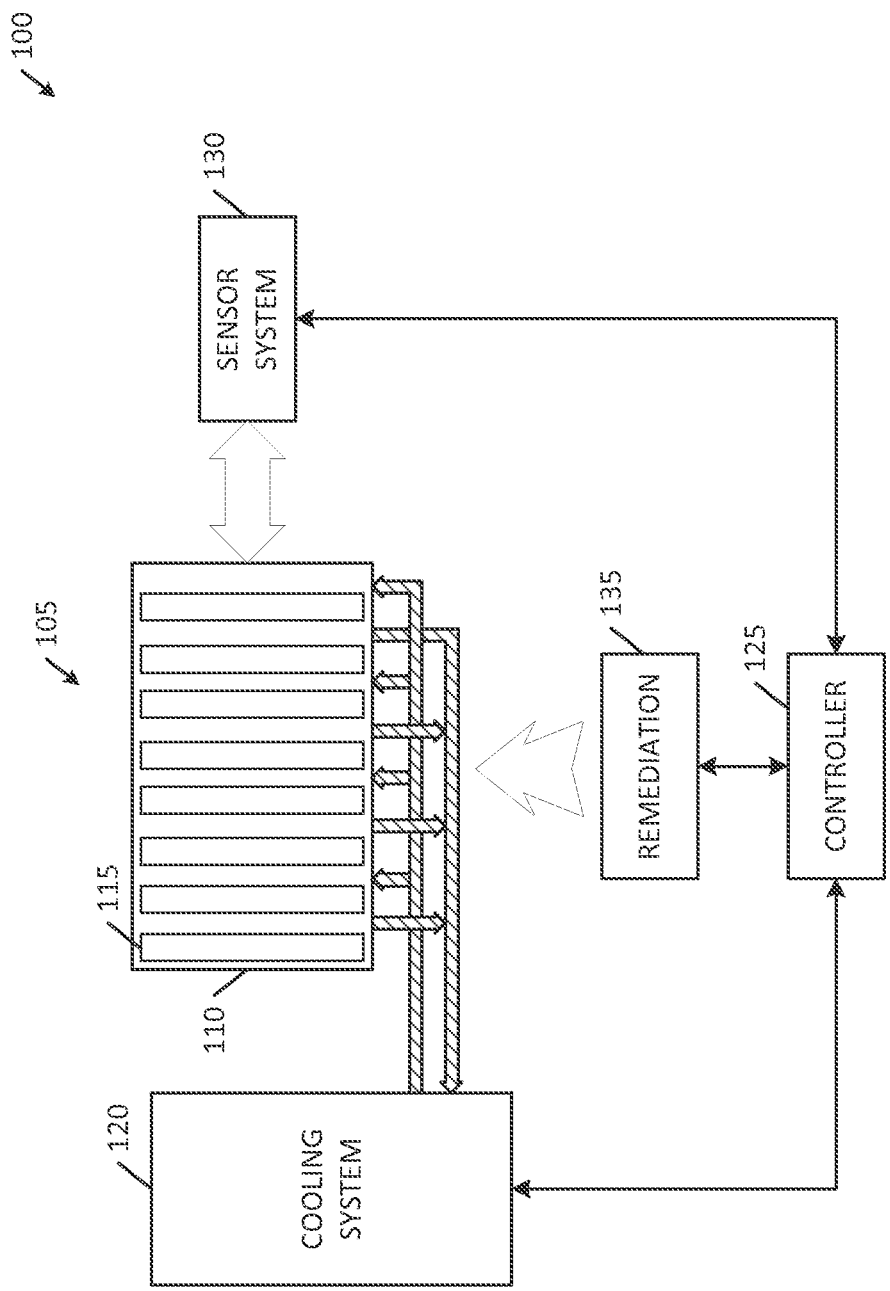
FIG. 1 illustrates a system of an electric vehicle that includes a propulsion battery that is cooled using a coolant recirculating through an enclosure that houses individual battery modules of the propulsion battery.

FIG. 1 illustrates a system 100 of an electric vehicle that includes a propulsion battery 105 that is cooled using a coolant recirculating through an enclosure 110 that houses a plurality of battery modules 115 of propulsion battery 105. There are many ways that a cooling system is implemented but will typically include a fluid reservoir 120. The cooling system is monitored and controlled by a controller 125. In the preferred embodiments, a particular sensing arrangement is implemented as more detailed below. One or more sensors of a sensor system 130 are used to monitor specifically for parameters indicating that the high voltage electrolysis is occurring or that it is likely occurring.

In general, detection of a high voltage electrolysis reaction includes proper selection, placement, and implementation of the one or more sensors of sensor system 130. Controller 125 monitors sensor system 130 and applies the proper detection logic based upon the detection mechanism. Upon detection of actual or possible high voltage electrolysis, controller 125 initiates operation of a remediation system 135 to respond appropriately to the detected actual or possible high voltage electrolysis. These two independent, though related, aspects of the present invention. The first is detection of a high voltage electrolysis event and the second is remediation of such an event. The remediation options, including those available beyond those shown and described herein, do not require detection of the high voltage electrolysis using one of the disclosed systems or processes. Similarly, detection options, including those available beyond those shown and described herein, do not require remediation of the high voltage electrolysis using one of the disclosed systems or processes.

Figure 3:
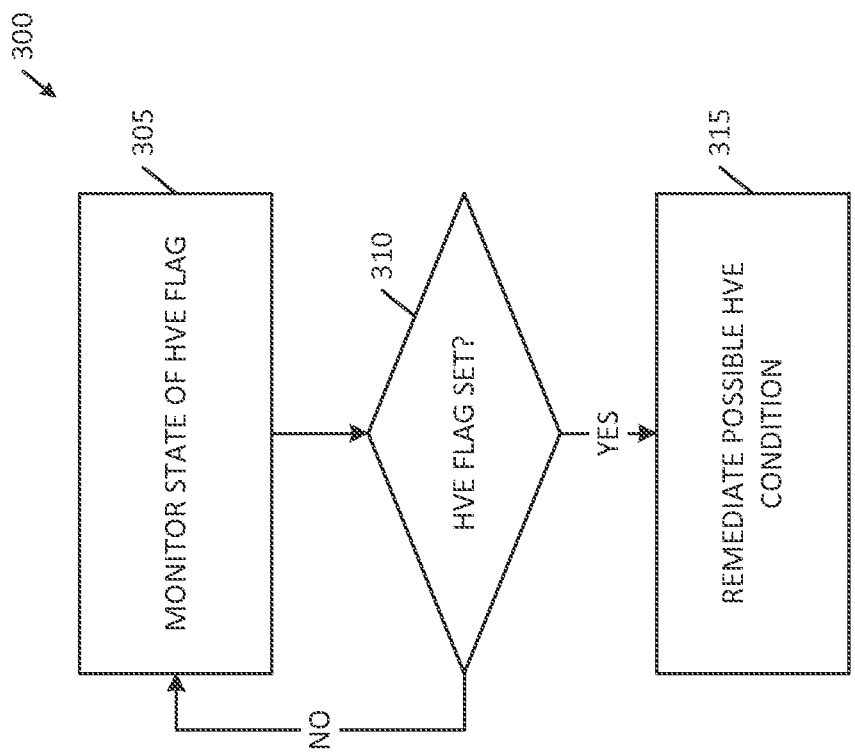
FIG. 3 illustrates a flow diagram for a remediation response process.
Figure 2:
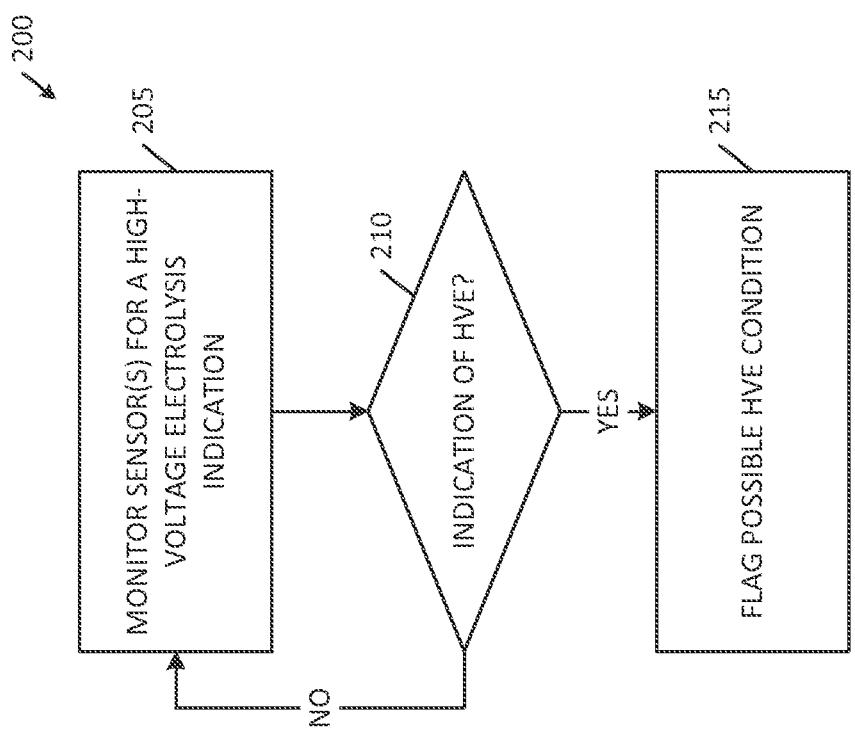
FIG. 2 illustrates a flow diagram for a detection process.

FIG. 2 and FIG. 3 further illustrate this independence and relationship. FIG. 2 illustrates a flow diagram for a detection process 200. Process 200 includes a high voltage electrolysis (HVE) monitoring step 205, an HVE test step 210, and an HVE flag step 215 when the test at step 210 is true.

Step 205 monitors one or more sensors of sensor system 130 shown in FIG. 1. The sensors are implemented to examine specific conditions, parameters, and operational characteristics of system 100 appropriate for the methodology used to detect an HVE of coolant inside a battery enclosure. An result of monitoring data from the sensors is tested at step 210 to determine whether HVE is underway. In some cases it may be an indication of likely HVE or possible HVE.

Depending upon the nature of the test and the threshold set for initiation of remediation, there may be different responses and urgency levels for initiation of the remediation. In some implementations, there are combinations of sensors providing different indications, not all of which may have the same urgency. There may also be different remediation responses appropriate for different types of sensor indications. Thus, the test at step 210 may be binary type indication (e.g., YES or NO as shown), or it may indicate varying probabilities for different possible risks.

When the test at step 210 is positive to indicate existence, or possible existence, of HVE in system 100, process 200 sets a flagging mechanism or other status mechanism appropriate for the test performed at step 210. Some other system or process may monitor the flag and initiate an appropriate response. Flagging a possible HVE condition within enclosure 110 identified in step 215 refers to those general concepts of acknowledging and initiating further action. This is not limited to polling/testing a state of a data flag but may include interrupt processing and other evaluative systems for responding to a state, variable, signal, or other "flag" that indicates an affirmative test/evaluation at step 210. The results of step 215 are made available to a response initiation process, such as the process shown in FIG. 3.

FIG. 3 illustrates a flow diagram for a response process 300. Process 300 includes a monitoring step 305, a test step 310, and a remediation initiation step 315. Step 305 includes an appropriate evaluative process for monitoring a status of an HVE flag, such as may have happened at step 215 of FIG. 2. Step 310 tests whether the HVE flag meets a predetermined pattern indicating that HVE is, or may be, occurring. The pattern may be a bit value, a threshold, or other parameter that can be used to selectively test for the HVE condition.

When the test at step 310 is affirmative that HVE is, or may be, occurring, process 300 executes step 315 to initiate remediation of the detected HVE condition. The initiation response varies but is appropriate for the detected condition and other implementation details. Further details of the sensor(s) and possible remediation response(s) are detailed below.

I. HVE Detection

Regarding specifics of representative sensors for sensor system 130. The preferred embodiments include process and apparatus that are useful to detect HVE within enclosure 110.

HUMIDITY—Sensor system 130 may include one or more humidity sensors. Enclosure 110 may be hermetically sealed but will often provide for one or more one-way exhaust ports to allow gas to escape. HVE boils the coolant and results in an increase in humidity. The humidity sensors are placed in the likely exhaust path(s) of enclosure 110, or likely location(s) of HVE. Analyses of the orientation and arrangement of enclosure 110, battery modules 115, and coolant circulation paths, including possible failure modes, provides an indication of these likely locations. In some cases, the design of one or more of these systems is adapted to improve detection using humidity sensors, or to enable fewer sensors to be used.

One way that humidity sensors may be used to detect HVE is to monitor for a particular pattern indicative of HVE in the particular implementation. For example, should the humidity sensors detect a sustained rise in humidity to 100% within a short period of time (e.g., 120 seconds). Other patterns may be appropriate in this or other contexts.

HYDROGEN GAS—Sensor system 130 may include one or more hydrogen gas sensors.

Enclosure 110 may be hermetically sealed but will often provide for one or more one-way exhaust ports to allow gas to escape. Hydrogen gas is produced during HVE. The hydrogen gas sensors are placed in the likely exhaust path(s) of enclosure 110, or likely location(s) of HVE. Analyses of the orientation and arrangement of enclosure 110, battery modules 115, and coolant circulation paths, including possible failure modes, provides an indication of these likely locations. In some cases, the design of one or more of these systems is adapted to improve detection using hydrogen gas sensors, or to enable fewer sensors to be used.

One way that hydrogen sensors may be used to detect HVE is to monitor for a particular pattern indicative of HVE in the particular implementation. For example, should the hydrogen gas sensors detect any increase in concentration of hydrogen above zero. Other patterns may be appropriate in this or other contexts.

TEMPERATURE—Sensor system 130 may include one or more temperature sensors. While the circulating coolant within enclosure 110 is isolated from the modules and high-potential voltage surfaces of propulsion battery 105, sometimes coolant may leak from the coolant system into enclosure 110. Enclosure 110 may be hermetically sealed and the leaking coolant may begin to pool. When such a pool bridges two potential surfaces having a large potential difference (e.g., >100V), HVE may begin. Initially the pooled and electrolyzing coolant has a boiling point of about 107° C. As the HVE continues, the composition of the pooled electrolyzing coolant changes, and the boiling point rises and can approach 197° C. The temperature sensors are placed within enclosure 110 at any locations where such pooling and bridging may occur. Analyses of the orientation and arrangement of enclosure 110, battery modules 115, and coolant circulation paths, including possible failure modes, provides an indication of these likely locations. In some cases, the design of one or more of these systems is adapted to improve detection using temperature sensors, or to enable fewer sensors to be used.

One way that temperature sensors may be used to detect HVE is to monitor for a particular pattern indicative of HVE in the particular implementation. For example, should the temperature sensors detect a sustained rise in local battery temperature of propulsion battery 105 within a specified period (e.g., 120 seconds) in an area likely to experience HVE to within ±5° C. of the nominal boiling point of the coolant ratio used in the liquid cooling system, followed possibly by a steady increase in temperature in these locations. Other patterns may be appropriate in this or other contexts.

PRESSURE—Sensor system 130 may include one or more pressure sensors. When enclosure 110 is hermetically sealed to prevent/inhibit ingress/egress of gas, many designs include pressure relief valves. The pressure sensors are placed inside such an enclosure. A particular pattern of gas build-up may indicate HVE. In some cases, the design of one or more of the enclosure, battery modules, and coolant system is adapted to improve detection using pressure sensors, or to enable fewer sensors to be used.

One way that pressure sensors may be used to detect HVE is to monitor for a particular pattern indicative of HVE in the particular implementation. For example, should the pressure sensors detect a sustained increase in pressure of propulsion battery 105 to the nominal relief pressure within a specified period (e.g., 120 seconds) due to rapid boiling of coolant. Other patterns may be appropriate in this or other contexts.

VOLTAGE—Sensor system 130 may include one or more voltage sensors. battery modules 115 are coupled in series to store and produce the energy of propulsion battery 105. Additionally, it is common for the modules themselves to include series-connected batteries or other battery unit. The voltage sensors are placed in enclosure 110 to measure real-time series voltage values of propulsion battery 105, battery modules 115, and batteries/battery units as necessary or desired.

One way that voltage sensors may be used to detect possible HVE is to monitor for a particular pattern indicative of HVE in the particular implementation and may make use of historical voltage levels stored by controller 125. For example, should the voltage sensors detect a voltage drop of contiguous series elements relative to unaffected series elements and relative to expected voltage drop. This voltage drop is indicative of an internal current loop. Depending on pack geometry, certain series elements are much more likely to be the terminal elements of an electrolysis short circuit than others. For example, in a pack configuration having a plurality of series-connected modules (each module including series connected cells) where every $x^{th}$ module (e.g., every fifth module) is proximate to other modules at high relative potential, the electrolysis reaction will bridge between these modules. A detection process can be particularly sensitive to contiguous voltage drops bookended by these series elements to more positively identify an internal short as an electrolysis phenomenon. Other patterns may be appropriate in this or other contexts.

CURRENT—Sensor system 130 may include one or more current sensors. battery modules 115 are coupled in series to store and produce the energy of propulsion battery 105. Additionally, it is common for the modules themselves to include series-connected batteries or other battery unit. The current sensors are placed in enclosure 110 to measure real-time series current values of propulsion battery 105, battery modules 115, and batteries/battery units as necessary or desired.

One way that current sensors may be used to detect possible HVE is to monitor for a particular pattern indicative of HVE in the particular implementation. For example, should the current sensors detect a reading higher than a reading at the pack terminals it may indicate an internal current loop possibly caused by electrolysis. Other patterns may be appropriate in this or other contexts.

COOLANT FLOW RATE—Sensor system 130 may include one or more coolant flow rate sensors. The cooling system recirculates coolant through enclosure 110 while isolating the coolant from coming into contact with the energy surfaces of propulsion battery 105. The coolant flow rate sensors are placed in a coolant flow path into, through, and out of enclosure 110 to measure an entering coolant flow rate and an exiting coolant flow rate.

One way that coolant flow rate sensors may be used to detect possible HVE is to monitor for a particular pattern indicative of HVE in the particular implementation. For example, should the coolant flow rate sensors detect that more coolant is flowing into enclosure 110 than is flowing out, it may indicate a leak of coolant into enclosure 110 that increases a risk of electrolysis. Other patterns may be appropriate in this or other contexts.

IMMERSION—Sensor system 130 may include one or more immersion sensors. When enclosure 110 is sealed to prevent/inhibit ingress/egress of fluid, strategically positioned immersion sensors are placed inside such an enclosure. A particular pattern of fluid accumulation may indicate HVE or a condition where HVE may occur. In some cases, the design of one or more of the enclosure, battery modules, and coolant system is adapted to improve detection using immersion sensors, or to enable fewer sensors to be used.

One way that immersion sensors may be used to detect possible HVE is to monitor for a particular pattern indicative of HVE in the particular implementation. For example, should the immersion sensors detect coolant accumulation within enclosure 110, a risk of electrolysis is increased. Other patterns may be appropriate in this or other contexts.

As noted herein, some implementations may use one or more of the sensors disclosed herein. Some of the implementations detect HVE with a high probability of accuracy while others detect possible HVE. Proper selection and use of one or more different types of sensors increases the data from which highly accurate predictions are made.

II. Remediation Response

The preferred embodiments include process and apparatus that are useful to respond to a detected or possible high voltage electrolysis reaction. The preferred responses include one or both of stopping the energy driving the HVE and lowering the boiling point of the electrolyzing coolant.

Open Circuit Response

Remediation system 135 includes a mechanism to open a short circuit caused by the conducting pool of coolant bridging two surfaces having a large potential difference. When such an internal short spans a large portion of the series chain, the HVE reaction can be stopped by intentionally breaking the chain and stopping the flow of energy into the pooled coolant, for example using overcurrent protection devices, and most preferably using sacrificial overcurrent protection devices such as fuses and the like. While it is unlikely that HVE will itself generate currents large enough to activate internal electrical safety mechanisms such as fuses, controller 125 can interrupt the series chain in one or more locations by opening relays or contactors or intentionally blowing fuses. Once an internal short has been identified, controller 125 intentionally blows one or more internal fuses, such as by activating a "crowbar" device at the pack terminals.

Coolant Addition

Remediation system 135 includes a mechanism to add coolant into enclosure 110. Under certain circumstances, adding coolant to the pack will significantly increase the amount of time to thermal runaway by increasing the amount of water which must be boiled away. Controller 125 activates pumps of the cooling system to push additional coolant through the leak and maintain a low ethylene-glycol/water ratio as the temperature at the HVE location rises.

Water Addition

Remediation system 135 includes a mechanism to add water into enclosure 110. Flooding the pack with water (via an inlet port or other means through the actions of first responders) dilutes and/or displaces the ethylene-glycol, dramatically reducing the electrolysis rate and hazard severity.

The systems and methods are preferably implemented using a microprocessor executing program instructions from a memory, the instructions causing the apparatus to perform as described herein.

The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A battery pack comprising:
   an enclosure containing a plurality of battery modules;
   a cooling system disposed among and electrically isolated from the plurality of battery modules, wherein the cooling system uses a coolant solution that is a first mixture of a first liquid and a second liquid in a predetermined ratio to produce a first boiling point for the coolant solution, wherein boiling of the coolant solution changes the predetermined ratio to produce a second boiling point for the coolant solution that is higher than the first boiling point and that is at a temperature sufficient to induce a thermal runaway condition for one or more battery modules of the plurality of battery modules;
   at least one sensor contained within the enclosure to monitor at least one operational characteristic of the plurality of battery modules; and
   a controller coupled to the at least one sensor and configured to determine a possible high voltage electrolysis within the enclosure based upon the at least one operational characteristic; and
   a remediation system coupled to the enclosure and responsive to the possible high voltage electrolysis to decrease risks associated with the possible high voltage electrolysis when operated.

2. The battery pack of claim 1, wherein the at least one operational characteristic comprises humidity within the enclosure.

3. The battery pack of claim 1, wherein the at least one operational characteristic comprises a hydrogen gas level within the enclosure.

4. The battery pack of claim 1, wherein the at least one operational characteristic comprises a temperature within the enclosure.

5. The battery pack of claim 1, wherein the at least one operational characteristic comprises a pressure within the enclosure.

6. The battery pack of claim 1, wherein the at least one operational characteristic comprises a voltage of a battery module of the plurality of battery modules.

7. The battery pack of claim 1, wherein the at least one operational characteristic comprises a current of a battery module of the plurality of battery modules.

8. The battery pack of claim 1, wherein the at least one operational characteristic comprises a coolant flow rate.

9. The battery pack of claim 1, wherein the at least one operational characteristic comprises a fluid accumulation within the enclosure.

10. The battery pack of claim 1, wherein in response the possible high voltage electrolysis the remediation system opens at least one circuit coupling the plurality of battery modules.

11. The battery pack of claim 1, wherein in response the possible high voltage electrolysis the remediation system causes the cooling system to add coolant.

12. The battery pack of claim 1, wherein in response the possible high voltage electrolysis the remediation system causes the cooling system to add water.

13. The battery pack of claim 1, wherein the controller determines a possible high voltage electrolysis within the enclosure based upon the at least one operational characteristic by comparing the at least one operational characteristic of the plurality of battery modules to at least one predetermined pattern.

14. The battery pack of claim 1, wherein the remediation system includes a port formed in the enclosure to support the remediation system adding a remediation liquid into the enclosure.

15. A method for operating a battery pack having an enclosure containing a plurality of battery modules, a cooling system disposed among and electrically isolated from the plurality of battery modules, at least one sensor contained within the enclosure, a controller, and a remediation system, the method comprising:
   operating the cooling system to use a coolant solution that is a first mixture of a first liquid and a second liquid in a predetermined ratio to produce a first boiling point for the coolant solution, wherein boiling of the coolant solution changes the predetermined ratio to produce a second boiling point for the coolant solution that is higher than the first boiling point that is at least a temperature sufficient to induce a thermal runaway condition for one or more battery modules of the plurality of battery modules;
   operating the at least one sensor to sense at least one operational characteristic of the plurality of battery modules; and
   operating the controller to determine a possible high voltage electrolysis within the enclosure based upon the at least one operational characteristic; and
   operating a remediation system responsive to the possible high voltage electrolysis to decrease risks associated with the possible high voltage electrolysis when operated.

16. The method of claim 15, wherein the at least one operational characteristic comprises one or more of:
   humidity within the enclosure;
   hydrogen gas level within the enclosure;
   temperature within the enclosure; or
   pressure within the enclosure.

17. The method of claim 15, wherein the at least one operational characteristic comprises one or more of:
   a voltage of battery module of the plurality of battery modules; or
   a current of battery module of the plurality of battery modules.

18. The method of claim 15, wherein the at least one operational characteristic comprises one or more of:
   a coolant flow rate; or
   a fluid accumulation within the enclosure.

19. The method of claim 15, wherein in response the possible high voltage electrolysis the remediation system opens at least one circuit coupling the plurality of battery modules.

20. The method of claim 15, wherein in response the possible high voltage electrolysis the remediation system causes the cooling system to add coolant or to add water.

21. The method of claim 15, wherein the controller determines a possible high voltage electrolysis within the enclosure based upon the at least one operational characteristic by comparing the at least one operational characteristic of the plurality of battery modules to at least one predetermined pattern.

22. The method of claim 15, wherein the remediation system includes a port formed in the enclosure to support the remediation system adding a remediation liquid into the enclosure.

* * * * *